US009042491B2

(12) United States Patent
Batchu et al.

(10) Patent No.: US 9,042,491 B2
(45) Date of Patent: May 26, 2015

(54) SYSTEMS, APPARATUS, AND METHODS FOR RECEIVING PAGING MESSAGES BY CREATING FAT PATHS IN FAST FADING SCENARIOS

(71) Applicant: Qualcomm Incorporated, San Diego, CA (US)

(72) Inventors: Bhaskara V. Batchu, Hyderabad (IN); Priyangshu Ghosh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 13/744,127

(22) Filed: Jan. 17, 2013

(65) Prior Publication Data

US 2014/0198882 A1     Jul. 17, 2014

(51) Int. Cl.
  *H04L 1/20*    (2006.01)
  *H04B 1/7073*  (2011.01)
  *H04B 1/7115*  (2011.01)

(52) U.S. Cl.
  CPC .............. *H04L 1/206* (2013.01); *H04B 1/7073* (2013.01); *H04B 1/7115* (2013.01)

(58) Field of Classification Search
  CPC .. H04B 1/7115; H04B 1/7117; H04B 1/7073; H04B 1/7107; H04B 7/0894; H04B 7/2628; H04L 1/206
  See application file for complete search history.

(56) References Cited

U.S. PATENT DOCUMENTS

| | | | | |
|---|---|---|---|---|
| 5,987,012 | A * | 11/1999 | Bruckert et al. | 370/331 |
| 7,006,468 | B1 * | 2/2006 | Chen et al. | 370/330 |
| 8,098,780 | B2 * | 1/2012 | Shesha et al. | 375/348 |
| 2003/0144020 | A1 * | 7/2003 | Challa et al. | 455/522 |
| 2005/0272425 | A1 * | 12/2005 | Amerga et al. | 455/436 |
| 2007/0178875 | A1 * | 8/2007 | Rao et al. | 455/343.1 |
| 2008/0008274 | A1 * | 1/2008 | Sudo et al. | 375/346 |
| 2008/0205556 | A1 * | 8/2008 | Wang | 375/340 |
| 2010/0150212 | A1 * | 6/2010 | Sheshadri et al. | 375/148 |
| 2012/0264390 | A1 * | 10/2012 | Clevorn et al. | 455/313 |
| 2013/0329616 | A1 * | 12/2013 | Attar | 370/311 |

FOREIGN PATENT DOCUMENTS

| | | |
|---|---|---|
| EP | 0661831 A2 | 7/1995 |
| EP | 0691754 A2 | 1/1996 |
| WO | WO-0165714 A1 | 9/2001 |

OTHER PUBLICATIONS

International Search Report and Written Opinion—PCT/US2014/011088—ISA/EPO—May 15, 2014.

* cited by examiner

*Primary Examiner* — Hirdepal Singh
(74) *Attorney, Agent, or Firm* — Knobbe Martens Olson & Bear LLP

(57) ABSTRACT

This disclosure provides systems, methods, and apparatus for receiving paging messages in fast fading scenarios. In one aspect, a method of demodulating a paging message during an assigned time slot by a wireless communications apparatus operating in an idle mode is provided. The method includes determining, in anticipation of the assigned time slot, an expected time position corresponding to a path of a pilot signal having a greater signal strength relative to other pilot signals. The method further includes assigning a first demodulation element to demodulate the pilot signal with reference to the expected time position and assigning a second demodulation element to demodulate the pilot signal with reference to a time offset from the expected time position. Other aspects, embodiments, and features are also claimed and described.

20 Claims, 10 Drawing Sheets

SYSTEMS, APPARATUS, AND METHODS FOR RECEIVING PAGING MESSAGES BY CREATING FAT PATHS IN FAST FADING SCENARIOS

TECHNICAL FIELD

The technology discussed in this patent application relates generally to wireless communications, and more specifically, to receiving paging messages using virtual paths in fast fading scenarios. Embodiments of the present invention enable improved call detection and call connection performance during poor communication channel conditions.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As mobile devices operate within a communication system, channel conditions may change. Due to fading or poor channel conditions, wireless signals transmitted may arrive at different unexpected times. In some cases, this may increase difficulties in the ability to demodulate signals. As such, methods and systems for successfully demodulating signals to improve call detection and performance in response to poor channel conditions are desirable.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of demodulating a paging message during an assigned time slot by a wireless communications apparatus operating in an idle mode. The method includes determining, in anticipation of the assigned time slot, an expected time position corresponding to a path of a pilot signal having a greater signal strength relative to other pilot signals. The method further includes assigning a first demodulation element of a rake receiver to demodulate the pilot signal with reference to the expected time position. The method further includes assigning a second demodulation element of the rake receiver to demodulate the pilot signal with reference to a time offset from the expected time position. The method further includes demodulating a signal to detect the paging message based at least in part on successfully demodulating the pilot signal using at least the first demodulation element or the second demodulation element.

Another aspect of the subject matter described in the disclosure provides a wireless communications apparatus for demodulating a paging message during an assigned time slot when operating in an idle mode. The apparatus includes a rake receiver comprising a first demodulation element and a second demodulation element. The apparatus further includes a controller configured to determine, in anticipation of the assigned time slot, an expected time position corresponding to a path of a pilot signal having a greater signal strength relative to other pilot signals. The controller is further configured to assign the first demodulation element to demodulate the pilot signal with reference to the expected time position. The controller is further configured to assign the second demodulation element of the rake receiver to demodulate the pilot signal with reference to a time offset from the expected time position. The rake receiver is configured to demodulate a signal to detect the paging message based at least in part on successfully demodulating the pilot signal using at least the first demodulation element or the second demodulation element.

Yet another aspect of the subject matter described in the disclosure provides a wireless communications apparatus for demodulating a paging message during an assigned time slot when operating in an idle mode. The apparatus includes a first means for demodulating a signal. The apparatus further includes a second means for demodulating a signal. The apparatus further includes means for determining, in anticipation of the assigned time slot, an expected time position corresponding to a path of a pilot signal having a greater signal strength relative to other pilot signals. The apparatus further includes means for assigning the first demodulating means to demodulate the pilot signal with reference to the expected time position. The apparatus further includes means for assigning the second demodulating means to demodulate the pilot signal with reference to a time offset from the expected time position. The apparatus further includes means for demodulating a signal to detect the paging message based at least in part on successfully demodulating the pilot signal using at least the first demodulating means or the second demodulating means.

Another aspect of the subject matter described in the disclosure provides a computer program product comprising a computer readable medium encoded thereon with instructions that when executed cause a wireless communications apparatus operating in an idle mode to perform a method of demodulating a paging message during an assigned time slot. The method includes determining, in anticipation of the assigned time slot, an expected time position corresponding to a path of a pilot signal having a greater signal strength relative to other pilot signals. The method further includes assigning a first demodulation element of a rake receiver to demodulate the pilot signal with reference to the expected time position. The method further includes assigning a second demodulation element of the rake receiver to demodulate the pilot signal with reference to a time offset from the expected time position. The method further includes demodulating a signal to detect the paging message based at least in part on successfully demodulating the pilot signal using at least the first demodulation element or the second demodulation element.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
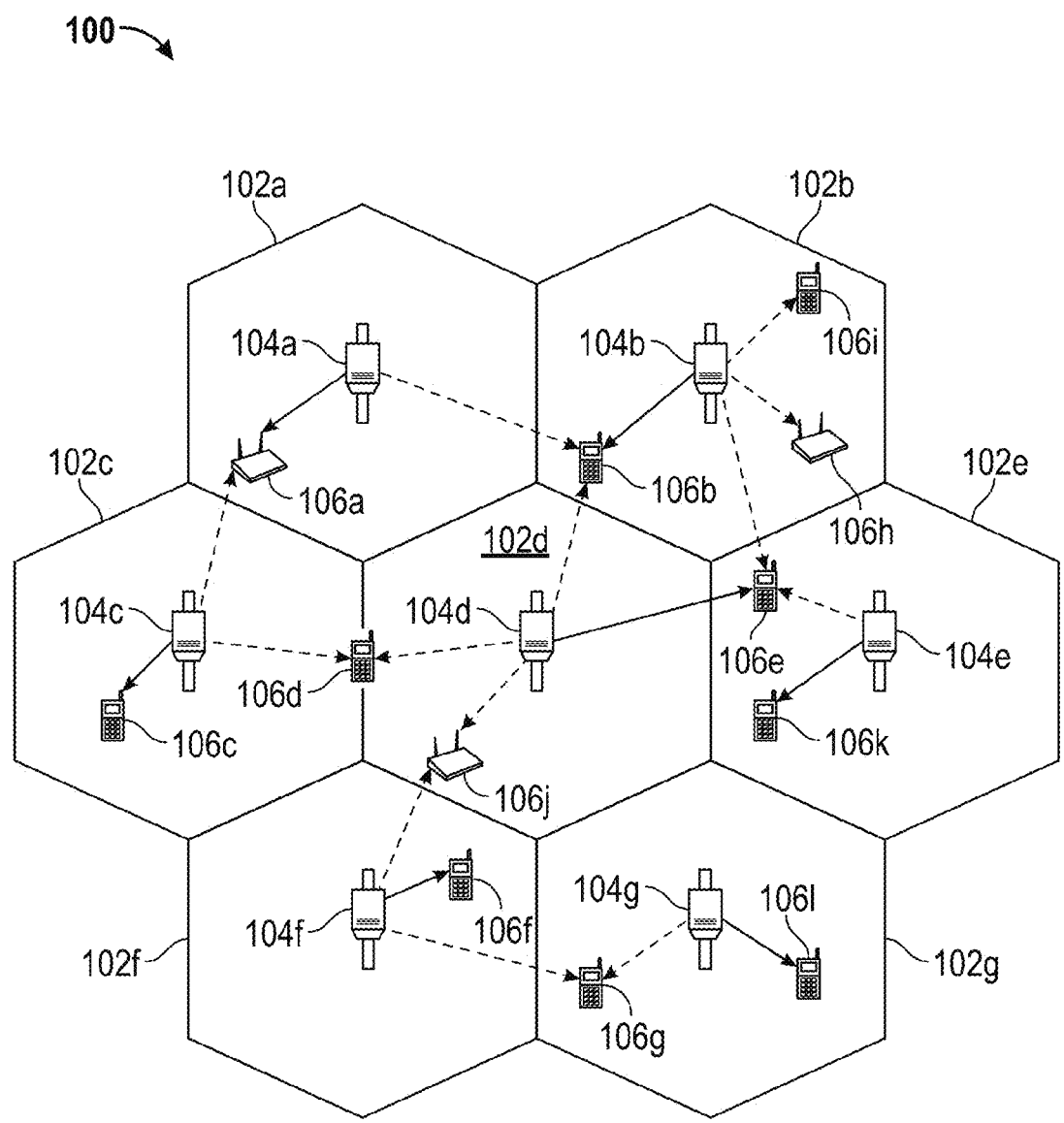
FIG. 1 is a diagram of an exemplary wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2).

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. The RL may also be referred to as the uplink. The nodes 104 may be interconnected, for example, by appropriate wired or wireless interfaces and may be able to communicate with each other. Each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. Communication may be accomplished using a plurality of collocated transmitters or may be communicated using one single transmitter.

Although the following embodiments may refer to FIG. 1, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 2:
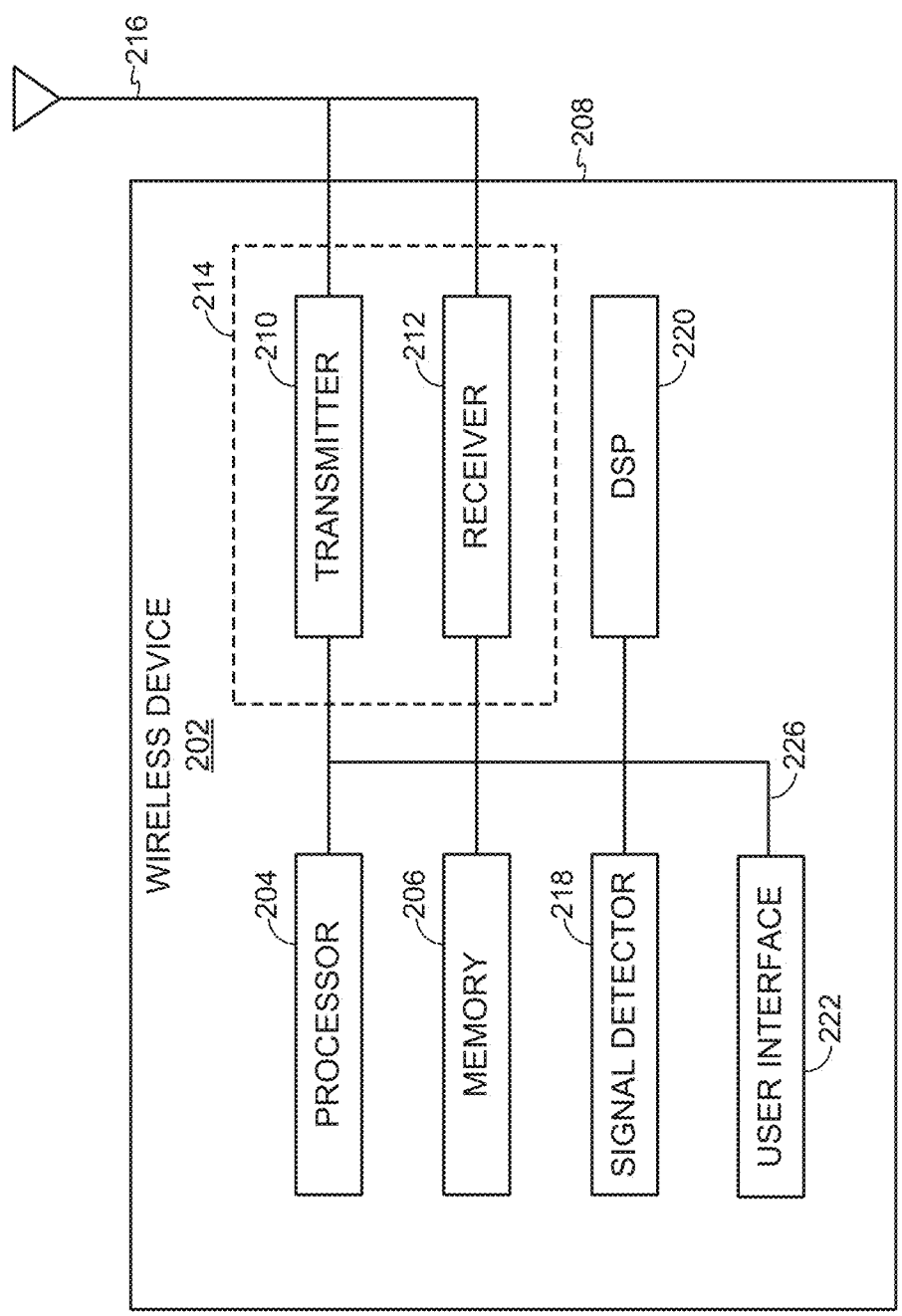
FIG. 2 is a functional block diagram of a wireless device that may be employed within the wireless communication system of FIG. 1 in accordance with some embodiments.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the node 104 or an AT 106. In some aspects, the wireless device 202 is configured to implement one or more of the radio access technologies described above, such as CDMA.

The wireless device 202 may include a processor 204 which controls operation of the wireless device 202. The processor 204 may also be referred to as a central processing unit (CPU), a controller, or a control unit. Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate one or more frames for transmission.

The wireless device 202 may comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As a signal is transmitted from a base station 104 to a wireless device 202, multiple copies of a transmitted signal may arrive at the wireless device 202. In one aspect, this is caused as one signal transmitted from the base station 104 may take different paths from the base station 104 to the wireless device 202. Each of the copies of the signal may arrive at slightly different times. For example, due to obstacles such as buildings, mountains, and the like, a copy of a signal may arrive directly at the wireless device 104 at one time and another copy may also bounce off an obstacle and arrive at the wireless device at a different time 202. In one aspect, a signal taking multiple paths may be referred to as a multipath signal. In order to recover the signal, the receiver 212 of the wireless device may be able to demodulate different multipath components of a signal via a rake receiver 212.

Figure 3:
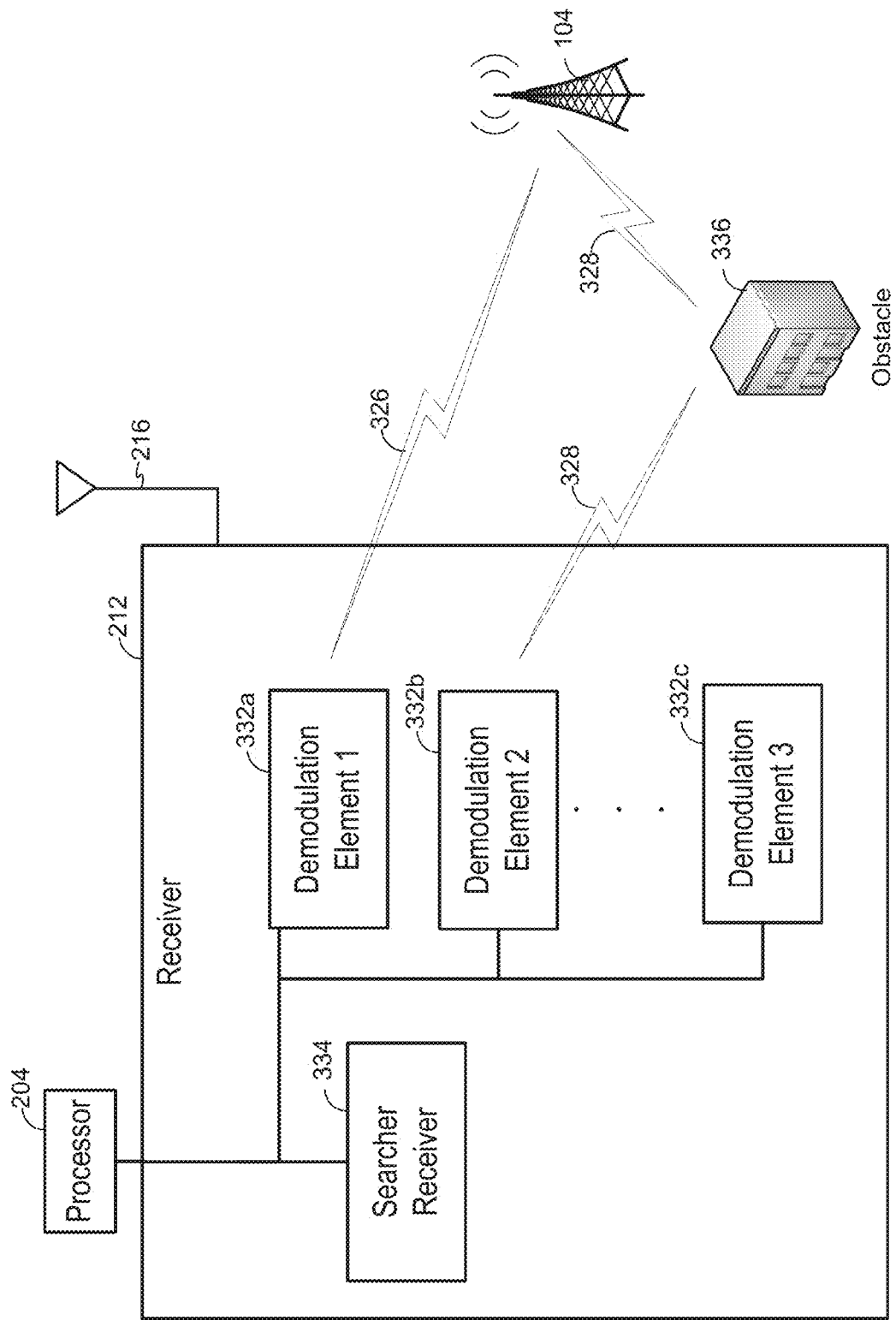
FIG. 3 is a functional block diagram of an exemplary rake receiver that may be employed within the wireless device 202 of FIG. 2 in accordance with some embodiments.

FIG. 3 is a functional block diagram of an exemplary rake receiver 212 that may be employed within the wireless device 202 of FIG. 2 in accordance with some embodiments. A base station 104 transmits a signal to the receiver 212 via the antenna 216 of the wireless device 202 (FIG. 2). One copy 326 of a signal proceeds directly to the receiver 212. Another copy 328 of the signal is redirected by an obstacle 336, such as a building, toward the receiver 212. To take advantage of the copies 326 and 328, the receiver 212 includes several demodulation elements including demodulation element 332a, demodulation element 332b, and demodulation element 332c (also collectively referred to herein as demodulation elements 332). Demodulation elements 332 may also referred to herein as the fingers of the rake receiver 212. The number of demodulation elements 332 may vary. For example, in one aspect, the receiver 212 may support eight or more demodulation elements 332. As is further described below, certain subsets of the demodulation elements 332 may be used in different operation modes. Each of the demodulation elements 332 is assigned to track and receive a different multipath component of a signal. For example, each of the demodulation elements 332 may be assigned a time delay value corresponding to a particular multipath component.

The receiver 212 may further include a searcher receiver 334. The searcher receiver 334 may be configured to determine relative arrival times (or offsets) of the paths in the received signal. As one non-limiting example, the searcher receiver 334 may scan a time domain of a channel to determine the location in the time domain and relative signal strengths of copies of a multipath signal. Based on this determination, the searcher receiver 334 assigns demodulation elements 332 to the various copies of the multipath signal. For example, the searcher receiver 334 may be configured to assign demodulation element 332a to a time delay value corresponding to a multipath signal. It should be appreciated that the processor 204 of the wireless device 202 described above with reference to FIG. 2 may be configured to perform one or more of the functions of the searcher receiver 334. In addition, the processor 204 may be configured to control one or more operations of the receiver 212 including the demodulation elements 332. In at least some aspects, the receiver 212 may be configured to receive one or more CDMA signals using the demodulation elements 332.

The wireless device 202 may operate according to one or more operating modes. For example, exemplary modes may include an initialization mode, an idle mode, an access mode, and a traffic mode. During an initialization mode, a wireless device 202 establishes communications with a base station 104 via at least in part acquisition of a pilot code channel and also synchronizes with the base station 104. In idle mode, the wireless device 202 may not be involved for example in a call (e.g., data call or voice call) but maintains communication with the base station 104. In a traffic mode, the wireless device 202 may have established an active call. Depending on the mode of operation, certain subsets of demodulation elements 332 may be assigned for use in different modes. For example, only a portion of the demodulation elements 332 (e.g., six) may be used during the idle mode, while an additional number of demodulation elements 332 may be used during the traffic mode (e.g., two additional demodulation elements 332 may be used to track pilot signals, in addition to the other six).

When operating in the idle mode, the wireless devices 202 may listen to a paging channel to receive paging messages from a base station 104. The paging messages may indicate to the wireless device 202 to enter another mode (e.g., the traffic mode) or take any one of a number of actions based on operation of and/or instructions from the network 100. In one embodiment, the network 100 may make use of slotted paging for use during the idle mode. In this case, the paging channel may be time-divided into a repeating cycle of slots. Each wireless device 202 associated with a base station may monitor a single one of the slots in each slot cycle.

Figure 4:
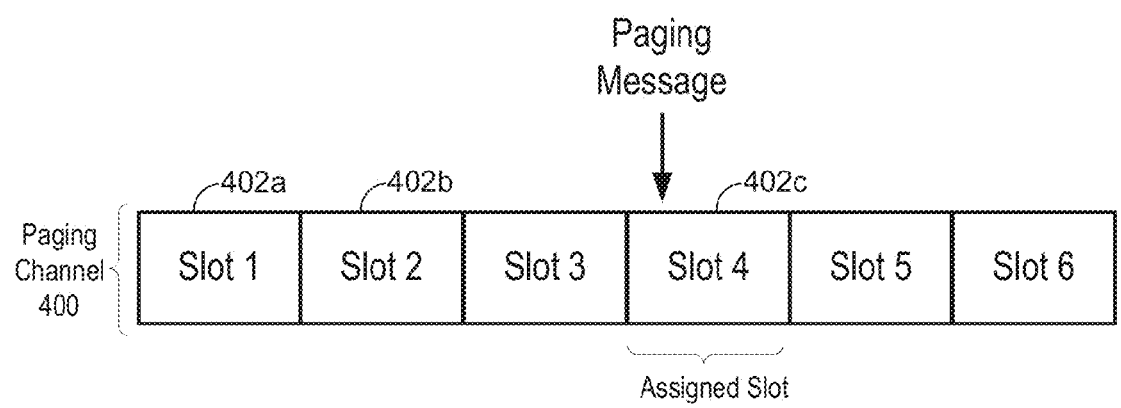
FIG. 4 is a diagram showing one or more paging slots when the wireless device of FIG. 2 is operating in a slotted paging mode in accordance with some embodiments.

FIG. 4 is a diagram showing a paging channel 400 including one or more paging slots 402a, 402b, and 402c. Multiple paging slots can be used when the wireless device of FIG. 2 is operating using slotted paging in an idle operating mode in accordance with some embodiments. As described above, the paging channel 400 transmits pages to different wireless devices in different slots 402a, 402b, and 402c. A wireless device 202 listens to an assigned slot 402c for any paging messages. In non-assigned slots, the wireless device 202 may perform other operations not requiring communication with the base station 104. In one aspect, the wireless device 202 may power down or de-activate at least a portion of its receiver 212 or other components during non-assigned slots 402a and 402b to consume less power. The time period in which the receiver 212 of the wireless device 202 powers at least partially down may be referred to as a sleep mode.

Before an assigned slot 402c, the wireless device 202 may need to wake up from the sleep mode in order to be able to determine if a paging message is sent during the assigned slot 402c.

Figure 5:
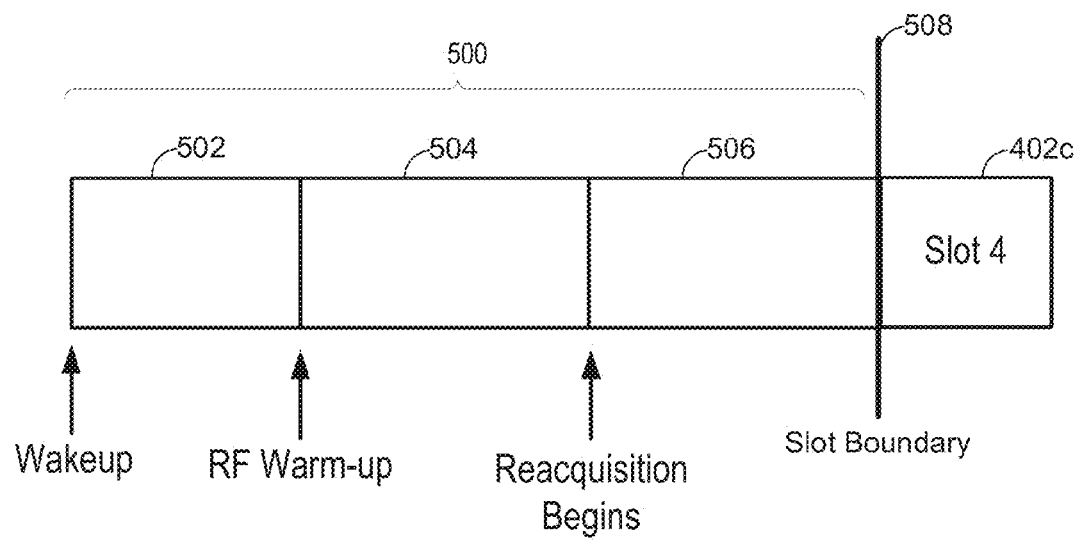
FIG. 5 is a diagram showing a time period for waking up to receive a paging message during an assigned slot when operating in a slotted paging mode in accordance with some embodiments.

FIG. 5 is a diagram showing a time period 500 for waking up to receive a paging message during an assigned slot 402c when operating in a slotted paging mode in accordance with some embodiments. At time period 502, some defined time period before the beginning 508 of the assigned slot 402c, the wireless device 502 may provide power to the components of the receiver 212. At time period 504, there may be some time period for warm-up of the RC components of the receiver 212 to be able to adequately demodulate incoming signals. In addition, at time period 506, the receiver 212 may reacquire a pilot signal from the base station 104 in order to re-synchronize its own internal timing with that of the base station 104. For example, after re-acquisition, the receiver 212 realigns its internal timing with that of the base station 104 prior to the beginning of the assigned slot 402c. Once re-synchronized, the wireless device 202 may be able to demodulate an incoming paging message during the assigned slot 402c.

To ensure that incoming paging messages are received, it is desirable for the receiver 212 to demodulate based on the strongest pilot path to be able to synchronize and decode a message. Otherwise, the wireless device 202 may miss incoming calls (e.g., for example calls such as Mobile Terminated (MT) calls and associated MT directed pages). For example, the receiver 212 may fail to reacquire the pilot signal before the paging message is received at the receiver 212 and the wireless device may miss all or part of the paging message.

One difficulty in re-acquiring the pilot signal is that there may be a shift in the expected arrival time of the pilot signal at the wireless device 202. This may cause, for example, the location of the pilot signal in the PN spreading code to change with respect to the receiver 212. The shift or "drift" of the pilot may be particularly pronounced in situations involving fast fading and other poor channel conditions. In addition, the longer the wireless device 202 is in a sleep mode while moving, the more the actual arrival time of the pilot signal may differ from the expected pilot signal arrival time. Accordingly, the pilot signal received by the receiver 212 may shift by one or more PN chips while the receiver 212 is asleep resulting in a longer re-acquisition procedure that may cause the paging message to be missed.

Figure 6:
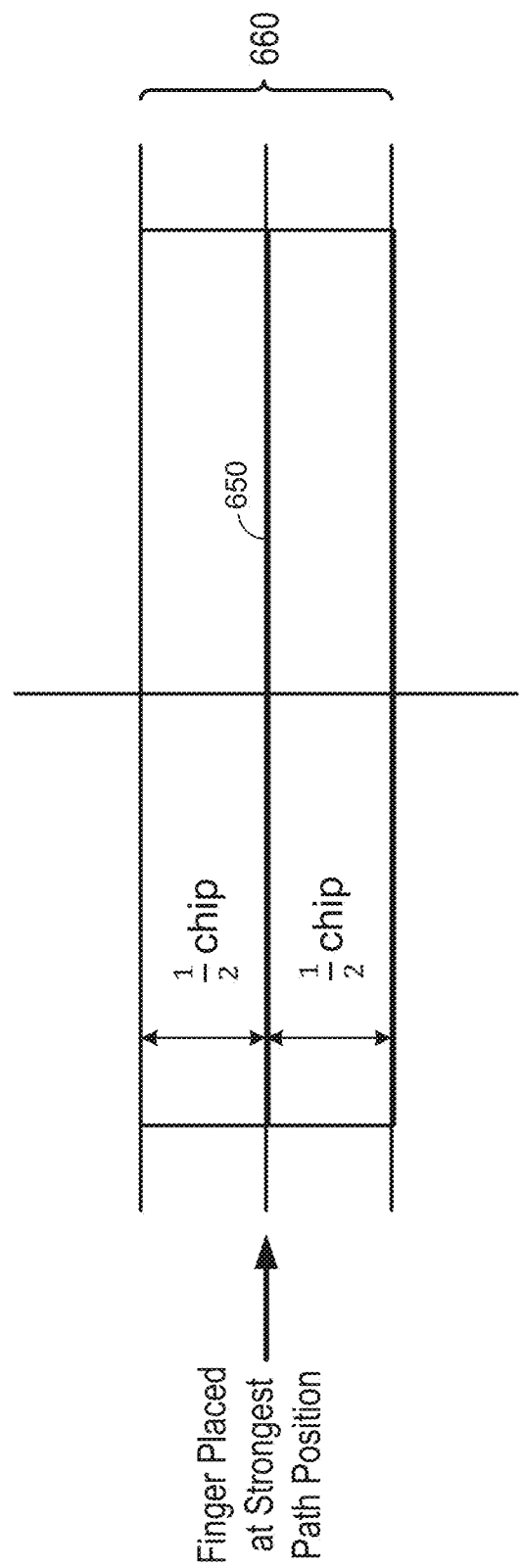
FIG. 6 is a diagram showing an amount of drift of a path of a pilot signal that may be tracked using a single demodulation element of a rake receiver in accordance with some embodiments.

FIG. 6 is a diagram showing an amount of drift of a path position 650 of a pilot signal that may be tracked using a single demodulation element 332a of a rake receiver 212 in accordance with some embodiments. A demodulation element 332a of the receiver 212 may be capable of tracking a single path position within a certain time period. For example, as shown in FIG. 6, a demodulation element 332a may be capable of tracking a path position within plus-or-minus one-half chips for a particular Pilot PN. That is, if the position of the pilot PN is within plus-or-minus one-half chips, the demodulation element 332a may successfully track in accordance with the pilot PN. If the position of the pilot is outside of plus-or-minus one-half chips, then the demodulation element 332a may not be able to track the path of the pilot signal. Bracket 660 shows the amount of drift that may be successfully tracked using a single demodulation element 332a.

In conjunction with the re-acquisition period 506 shown in FIG. 5, the wireless device 202 wakes-up (periods 502 and 504) and determines the strongest path position for the pilot and assigns a demodulation element 332a to decode the page message based on this path. In addition, the receiver 212 may in some cases track both the path of the strongest pilot via demodulation element 332a along with other multi-path variants via other demodulation elements 332. If the path drift of the strongest pilot path position (e.g., difference in position of current and earlier strongest path) is beyond plus-or-minus one-half chips, then the demodulation element 332a is unable to track the pilot path. In such a situation, the demodulation element 332a needs to be placed at the new strongest pilot path position, which may consume several milliseconds before the demodulation elements 332 are "ramped up" on the new strongest path. During the time it may take to place the demodulation element 332a on the new strongest pilot path position, there is a possibility that the wireless device misses the paging message at the slot boundary 508. Thus, if the drift of a pilot is more than plus-or-minus one-half chips, for example, the demodulation element 332a is unable to track the pilot path leading to demodulation failures in slotted idle mode operation. As described above, this scenario may be a result of fast fading and poor RF channel conditions, where large pilot drifts may occur. This leads to degradation of call performance of a wireless device 202 and is undesirable.

In accordance, certain aspects of certain embodiments are directed to improving the ability to demodulate based on the strongest path during a slotted idle operating mode. One aspect of embodiment creates a fat path. The fat path can be based on the strongest path position to improve chances of decoding a page message at the slot boundary 508 (FIG. 5). Stated another way, an embodiment provides for tracking a larger range for the path position to track a wider range of pilot drifts. According to an embodiment, the fat path is created based on the strongest path position by creating one or two additional paths (e.g., assigning additional demodulation elements 332b and 33c) with some chip delay from the strongest path position (e.g., +/−1 chip). This may increase the path diversity during slotted idle mode and increase the chances of decoding paging messages at the slot boundary 508. In some aspects, this procedure may be provided for under certain conditions such as for Veh-A, weak channel, and other fading scenarios.

According to an embodiment, tracking a larger range of path drift is achieved by using additional demodulation elements 332b and 332c that track additional paths created around the strongest path. For example, as described above, in an idle state, normally up to six demodulation elements 332 may be used while in traffic state an additional two demodulation elements 332b and 332c may be used to track pilots. According to an embodiment, the two demodulation elements 332b and 332c that may normally be used in the traffic state may be used to track two new paths created around the strongest path. For example, in accordance with an embodiment, demodulation element 332b is placed at the strongest path position plus an offset and will track signals with reference to the offset assigned position. Furthermore, demodulation element 332c is placed at the strongest path position minus an offset.

Figure 7:
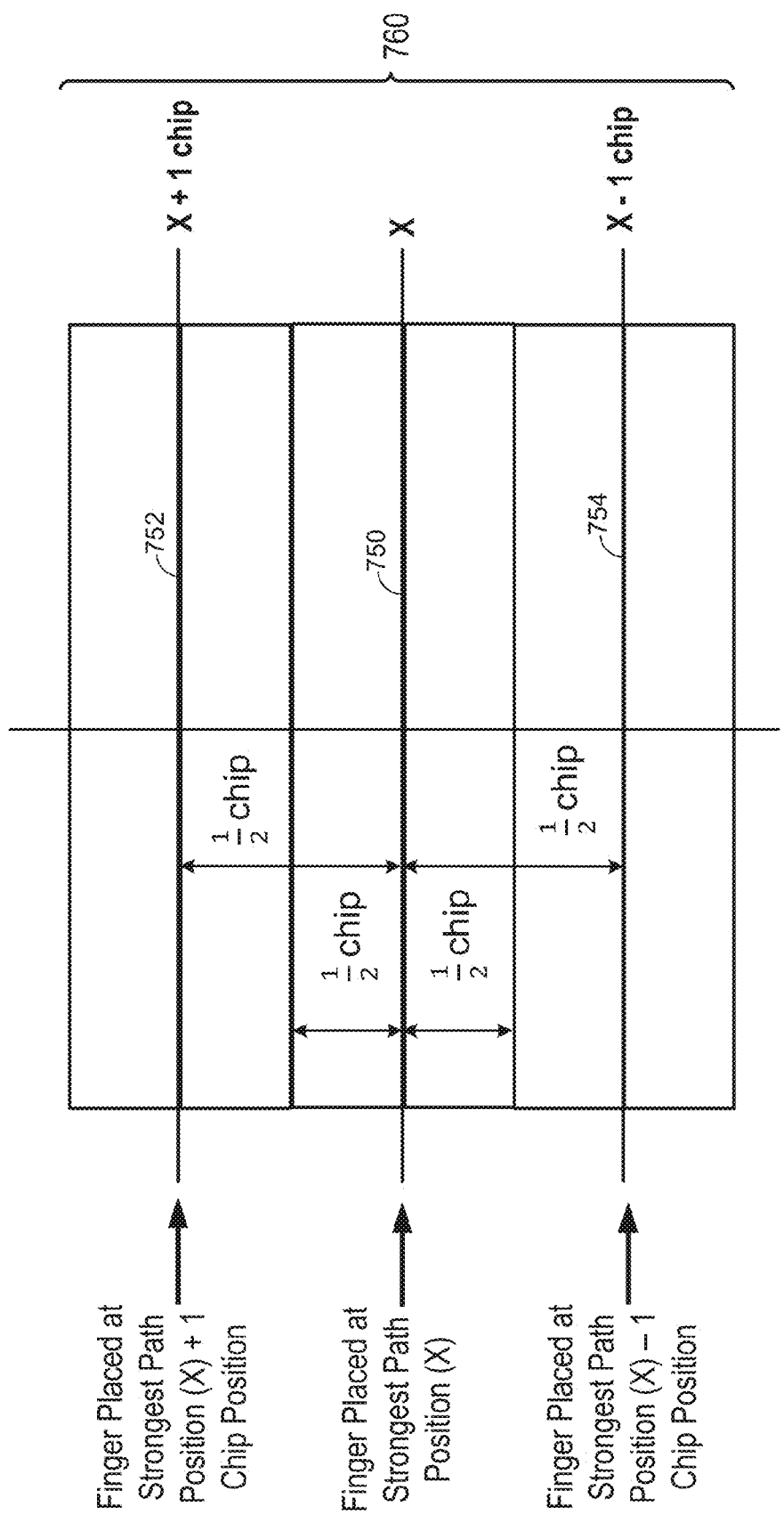
FIG. 7 is diagram showing an amount of drift of a path of a pilot signal that may be tracked using multiple demodulation elements of a rake receiver in accordance with some embodiments.

FIG. 7 is diagram showing an amount of drift 760 of a path of a pilot signal that may be tracked using multiple demodulation elements 332 of a rake receiver 212, in accordance with some embodiments. As shown in FIG. 7, and as just described, a demodulation element 332a ("finger") is configured to demodulate with reference to a time position of the determined strongest path 750 corresponding to time position X, which tracks pilot drift within plus-or-minus one-half chips of position X. A second demodulation element 332b is configured to demodulate to track a path 752 at time position X+1 chip such that it corresponds to the strongest path position plus one chip position. This demodulation element 332b tracks pilot drift within plus-or-minus one-half chips of position X+1 chip. A third demodulation element 332c is configured to demodulate to track a path 754 at time position X−1 chip such that it corresponds to the strongest path position minus one chip position. This demodulation element 332c can track pilot drift within plus-or-minus one-half chips of position X−1 chip. As such, the range of pilot drift 760 that may be tracked is significantly increased. For example, with added demodulation elements 332b and 332c, pilot drift is tracked up to at least plus-or-minus one-and-a-half chips as compared to plus-or-minus one-half chips.

In some embodiments, demodulation elements 332b and 332c are assigned to "virtual" paths. In these scenarios, there is no actual detected multipath signal copy at the assigned path positions. Rather, the strongest multipath signal copy is detected and the demodulation elements 332b and 332c are assigned chip (i.e., time) position offsets from the single multipath signal. While other multipath signal copies may be present, they may optionally be tracked using other demodulation elements (e.g., for example as six demodulation elements are used during idle mode). In some embodiments, however, only a single pilot path is identified and used for re-acquisition (e.g., where no multipath signal copies are present or where tracking will only depend on one path). As such, in this case, a demodulation element 332a is assigned to this "strongest" path position and demodulation elements 332b and 332c are assigned to chip position offsets as just described and other demodulation elements 332 are unused. In accordance with some embodiments, rather than being used to track actual different multipath components of the signal, demodulation elements 332b and 332c are used for increasing the range for tracking a single pilot signal to create a "fatter" path to account for path drift.

These mechanisms increase the robustness of the rake receiver 212 and allow for tracking larger pilot drifts successfully without page message losses. As larger pilot drifts are expected in fast fading channel conditions, this may allow for being able to demodulate pages successfully, even under these conditions. Moreover, path diversity is improved.

It should be appreciated while some embodiments have been described relative to ½ chips or 1 chip offsets, these values are non-limiting and may change in accordance with different implementations of different demodulation elements 332 capable of tracking different drifts. As such, different ranges (e.g., between 0 to 10 chips or higher or lower) of tracking offsets may be applied according to the principles described herein.

Figure 8:
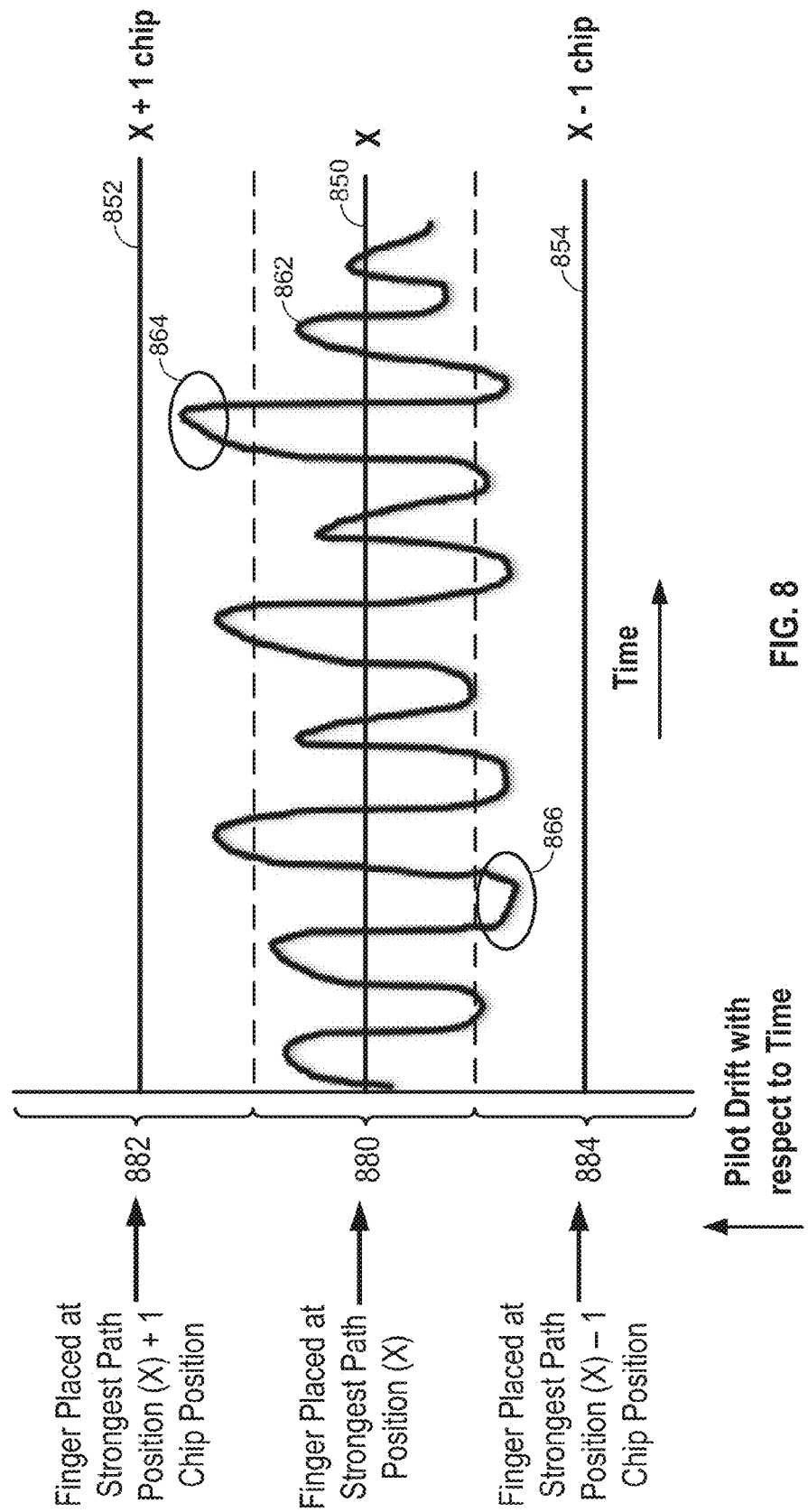
FIG. 8 is another diagram showing an amount of drift of a path of a pilot signal that may be tracked using multiple demodulation elements of a rake receiver in accordance with some embodiments.

FIG. 8 is another diagram showing an amount of drift 862 of a path of a pilot signal that may be tracked using multiple demodulation elements 332 of a rake receiver 212 in accordance with some embodiments. The x-axis represents time while the y-axis represents pilot drift 862 with respect to time. Ranges 880, 882, and 884 show the regions in which pilot drift may be tracked by each demodulation element 332a, 332b, and 332c, respectively. As shown by the drift line 862, the position of the strongest pilot may drift from an expected position X. While the drift of the position of the pilot is within, for example, plus-or-minus ½ chips of the expected position X, the demodulation element 332a assigned to position X is able to track the pilot. For example, the demodulation element 332a is able to demodulate based on the expected PN sequence given the timing of the sequence in the signal. However, as shown by regions 864 and 866, in some cases the position of the pilot drifts out of this range 880. However, as shown by region 864, the position of the pilot is well within the range that may be tracked by another demodulation element 332b assigned to position X+1 chip position. As such, at this time, the pilot may be tracked by the demodulation element 332b. Similarly, as shown by region 866, the position of the pilot drifts outside the range which can be tracked by the demodulation element 332a assigned to position X. However, the position of the pilot is well within the range which can be tracked by demodulation element 332c assigned to track based on position X−1 chip position. Accordingly, the range of pilot drift that can be adequately tracked is significantly increased. As described above, the demodulation elements 332b and 332c used to create a "fat" path as just described may be used during a slotted idle mode.

In accordance with some embodiments, the use of the additional demodulation elements 332b and 332c, as just described with reference to FIGS. 7 and 8, may be reserved for use only during certain detected operating conditions. For example, the additional demodulation elements 332b and 332c may be used upon detecting poor RF or fast fading change conditions during idle mode. If the poor operating conditions are not detected, then demodulation elements 332b and 332c may not be used in accordance with that described during the idle mode. For example, the use of the additional demodulation elements 332b and 332c in accordance with the above may be triggered on the basis of one or more detected channel parameters such as Pilot Ec/Io variations (sleep/wake-up), channel estimation (in dB), Rx-AGC variations, finger RSSI variations (sleep/wakeup), QPCH erasures, and the like.

In one aspect, embodiments may allow for improving call performance (e.g., 1x mobile terminated (MT) call performance) in fast fading and poor RF channel conditions by substantially five to eight percent or higher. Furthermore, there may be little impact on the power consumed by the receiver 212 as clocks may be configured already to support the additional demodulation elements 332b and 332c in the idle mode. Furthermore, the ability to improve call performance, in accordance with the embodiments described herein may implemented solely by the wireless device 204 without an implementation by the base station 104.

Figure 9:
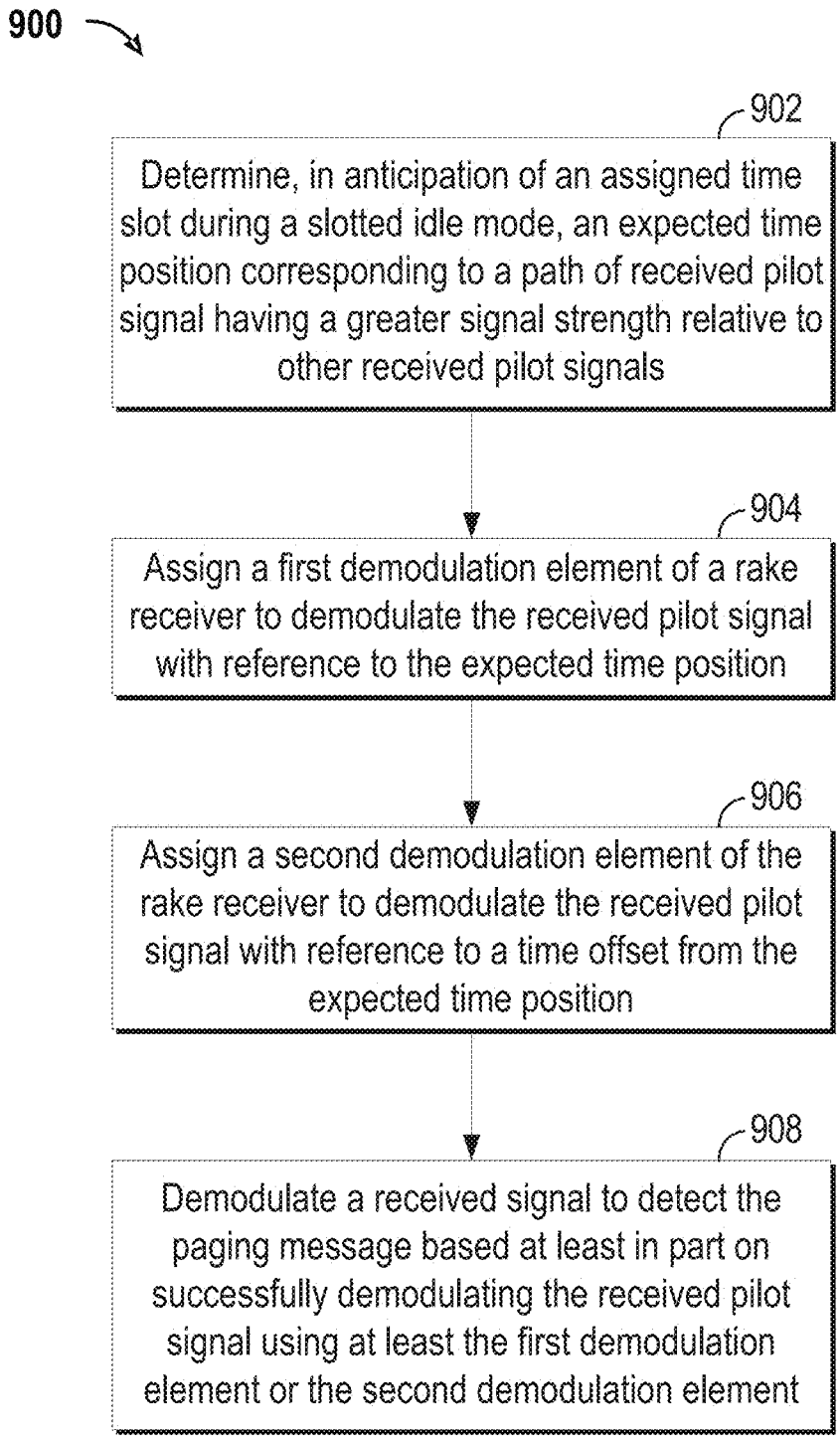
FIG. 9 is a flowchart of an implementation of an exemplary method for receiving a paging message during a slotted idle mode in accordance with some embodiments.

FIG. 9 is a flowchart of an implementation of an exemplary method 900 for receiving a paging message during a slotted idle mode, in accordance with some embodiments. At block 902, a wireless device 202 determines, in anticipation of an assigned time slot during a slotted idle mode, an expected time position corresponding to a path of a received pilot signal having a greater strength relative to other received pilot signals. At block 904, a first demodulation element of a rake receiver 212 is assigned to demodulate the received pilot signal with reference to the expected time position. At block 906, a second demodulation element of the rake receiver 212 is assigned to demodulate the received pilot signal with reference to a time offset from the expected time position. At block 908, a receiver 212 of the wireless device 202 demodulates a received signal to detect the paging message based at least in part on successfully demodulating the received pilot signal using at least the first demodulation element or the second demodulation element.

Figure 10:
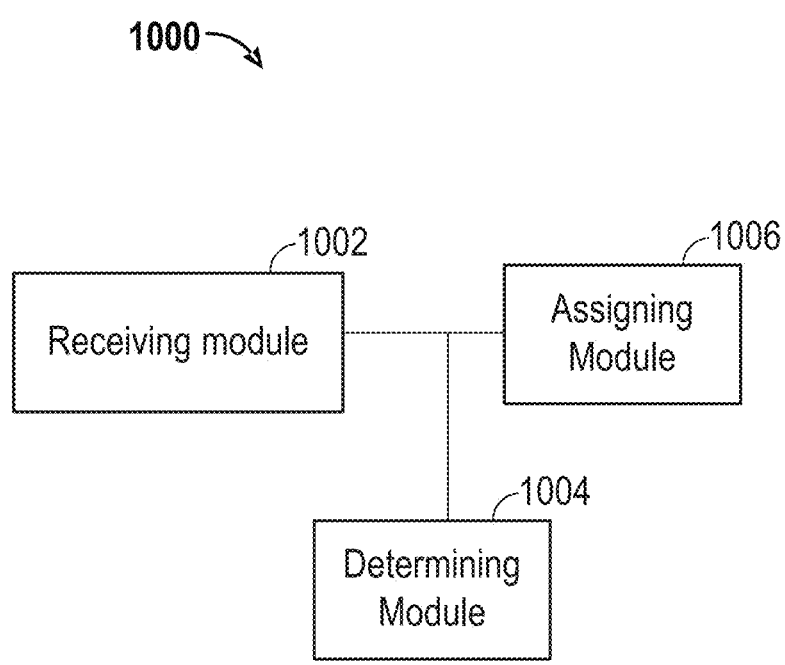
FIG. 10 is a functional block diagram of another exemplary wireless communications apparatus that may be employed within the wireless communication system in accordance with some embodiments.

FIG. 10 is a functional block diagram of another exemplary wireless communications apparatus 1000 that may be employed within the wireless communication system 100 in accordance with some embodiments. Those skilled in the art will appreciate that a wireless communication device 1000 may have more components, such as any one or more of the components shown in FIG. 2. The wireless communication device 1000 shown includes only those components useful for describing some prominent features of certain embodiments. The device 1000 includes a receiving module 1002. In some cases, a means for receiving may include the receiving module 1002. The receiving module 1002 may be configured to perform one or more of the function described with respect to the blocks of FIG. 9. The device 1000 further includes a determining module 1004. In some cases, a means for determining may include the determining module 1004. The determining module 1004 may be configured to perform one or more of the functions described with respect to the blocks of FIG. 9. The device 1000 further includes an assigning module 1006. In some cases, a means for assigning may include the assigning module 1006. The assigning module 1006 may be configured to perform one or more of the functions described with respect to the blocks of FIG. 9.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 11:
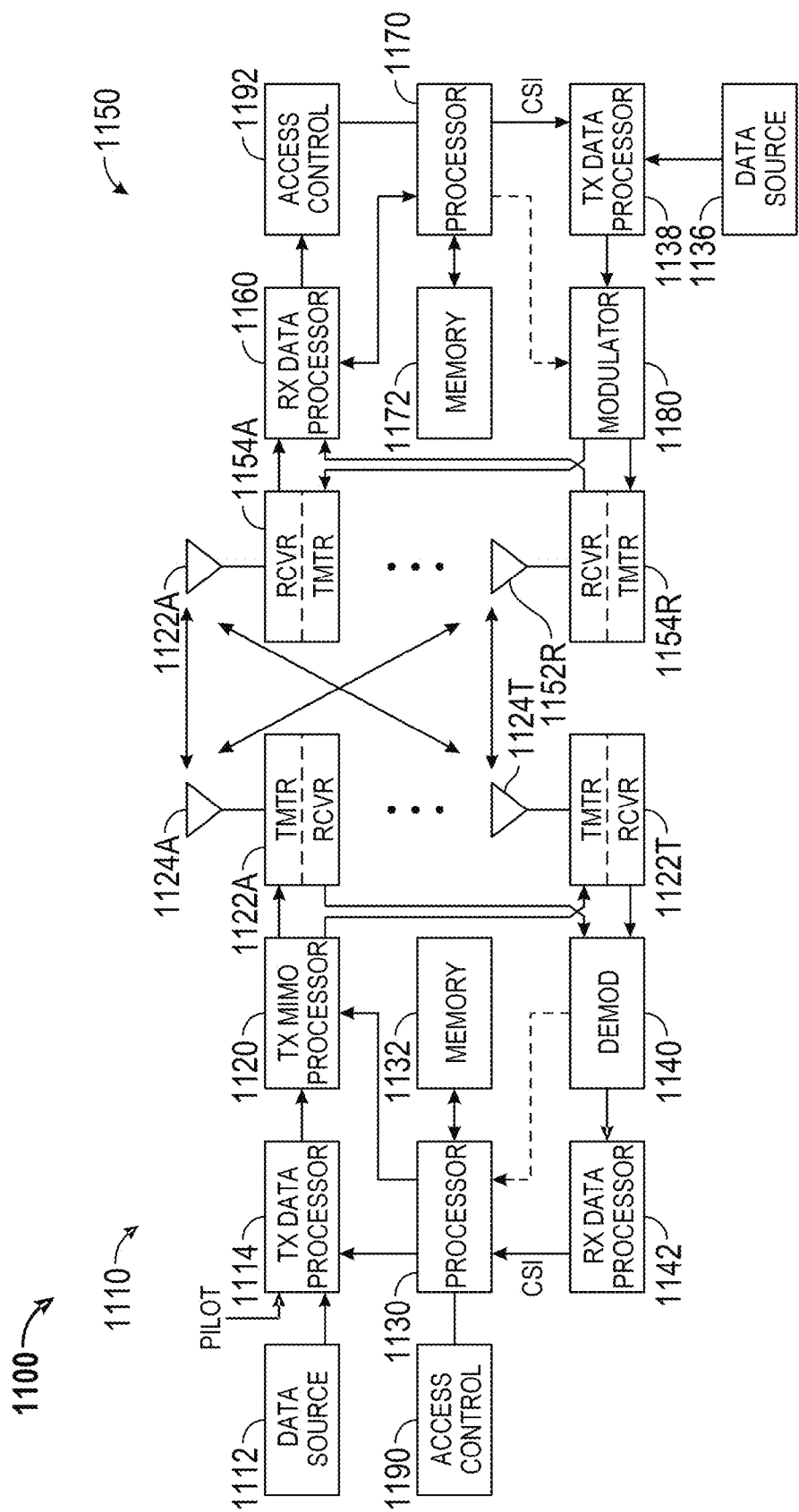
FIG. 11 depicts several sample components that may be employed to facilitate communication between nodes in accordance with some embodiments.

Furthermore, as indicated by the systems and methods described above, the teachings herein may be incorporated into a node (e.g., a device) employing various components for communicating with at least one other node. FIG. 11 depicts several sample components that may be employed to facilitate communication between nodes in accordance with some embodiments. Specifically, FIG. 11 is a simplified block diagram of a first wireless device 1110 (e.g., an access point) and a second wireless device 1150 (e.g., an access terminal) of a multiple-in-multiple-out (MIMO) system 1100. At the first device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beamforming weights to the symbols of the data streams and to the antenna from which the symbol is being transmitted.

Each transceiver 1122 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the second device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and down converts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the second device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the second device 1150 are received by the antennas 1124, conditioned by the transceivers 1122, demodulated by a demodulator (DEMOD) 1140, and processed by a RX data processor 1142 to extract the reverse link message transmitted by the second device 1150. The processor 1130 then determines which precoding matrix to use for determining the beam-forming weights then processes the extracted message.

FIG. 11 also illustrates that the communication components may include one or more components that perform access control operations as taught herein. For example, an access control component 1190 may cooperate with the processor 1130 and/or other components of the device 1110 to send/receive signals to/from another device (e.g., device 1150) as taught herein. Similarly, an access control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the access control component 1190 and the processor 1130 and a single processing component may provide the functionality of the access control component 1192 and the processor 1170. Furthermore, the components of the apparatus 1100 described with reference to FIG. 3 may be incorporated with/into the components of FIG. 11.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method of demodulating a paging message during an assigned time slot by a wireless communications apparatus operating in an idle mode, the method comprising:
   determining, in anticipation of the assigned time slot, an expected time position corresponding to a path of a pilot signal having a greater signal strength relative to other pilot signals;
   assigning a first demodulation element of a rake receiver to demodulate the pilot signal with reference to the expected time position;
   assigning a second demodulation element of the rake receiver to demodulate the pilot signal with reference to a time offset from the expected time position, wherein the time offset is a first time offset;
   assigning a third demodulation element of the rake receiver to demodulate the pilot signal with reference to a second time offset from the expected time position, wherein the second time offset is different than the first time offset; and
   demodulating a signal to detect the paging message based at least in part on successfully demodulating the pilot signal using at least the first, second, or third demodulation element;
   wherein one of the following applies:
   the second time offset is substantially equal to and opposite from the first time offset;
   the first time offset corresponds to substantially one chip position ahead of the expected time position, and wherein the second time offset corresponds to one chip position behind the expected time position; or
   successfully demodulating the pilot signal comprises successfully demodulating the pilot signal when an actual time position of the pilot signal, due to drift, is up to substantially one and one-half chip positions from the expected time position.

2. The method of claim 1, wherein assigning at least one of the second or third demodulation element is in response to detecting an absence of multipath copies of the pilot signal.

3. The method of claim 1, wherein assigning at least one of the second or third demodulation element is in response to detecting a performance characteristics based on at least one of pilot $E_c/I_o$ variations, channel estimation (in dB), Rx-AGC variations, finger RSSI variations, and QPCH ERASURES.

4. The method of claim 1, wherein demodulating the signal to detect the paging message comprises realigning internal timing with a base station transmitting the paging message based at least in part on the pilot signal when successfully demodulated.

5. A wireless communications apparatus for demodulating a paging message during an assigned time slot when operating in an idle mode, comprising:
   a rake receiver comprising a first demodulation element, a second demodulation element, and a third demodulation element; and
   a controller configured to:
   determine, in anticipation of the assigned time slot, an expected time position corresponding to a path of a pilot signal having a greater signal strength relative to other pilot signals;
   assign the first demodulation element to demodulate the pilot signal with reference to the expected time position;
   assign the second demodulation element of the rake receiver to demodulate the pilot signal with reference to a time offset from the expected time position, wherein the time offset is a first time offset; and
   assign the third demodulation element of the rake receiver to demodulate the pilot signal with reference to a second time offset from the expected time position, wherein the second time offset is different than the first time offset, and wherein the rake receiver is configured to demodulate a signal to detect the paging message based at least in part on successfully demodulating the pilot signal using at least the first, second, or third demodulation element;
   wherein one of the following applies:
   the second time offset is substantially equal to and opposite from the first time offset;
   the first time offset corresponds to substantially one chip position ahead of the expected time position, and wherein the second time offset corresponds to one chip position behind the expected time position; or
   successfully demodulating the pilot signal comprises successfully demodulating the pilot signal when an actual time position of the pilot signal, due to drift, is up to substantially one and one-half chip positions from the expected time position.

6. The apparatus of claim 5, wherein the controller is configured to assign at least one of the second or third demodulation element in response to detecting an absence of multipath copies of the pilot signal.

7. The apparatus of claim 5, wherein the controller is configured to assign at least one of the second or third demodulation element in response to detecting a performance characteristics based on at least one of pilot $E_c/I_o$ variations, channel estimation (in dB), Rx-AGC variations, finger RSSI variations, and QPCH ERASURES.

8. The apparatus of claim 5, wherein the controller is configured to realign internal timing with a base station transmitting the paging message based at least in part on the pilot signal when successfully demodulated.

9. A wireless communications apparatus for demodulating a paging message during an assigned time slot when operating in an idle mode, comprising:
   first means for demodulating a signal;
   second means for demodulating a signal;
   third means for demodulating a signal;
   means for determining, in anticipation of the assigned time slot, an expected time position corresponding to a path of a pilot signal having a greater signal strength relative to other pilot signals;
   means for assigning the first demodulating means to demodulate the pilot signal with reference to the expected time position;
   means for assigning the second demodulating means to demodulate the pilot signal with reference to a time offset from the expected time position;
   means for assigning the third demodulating means to demodulate the pilot signal with reference to a second time offset from the expected time position, wherein the second time offset is substantially equal to and opposite from the first time offset; and
   means for demodulating a signal to detect the paging message based at least in part on successfully demodulating the pilot signal using at least the first, second, or third demodulating means.

10. The apparatus of claim 9, wherein successfully demodulating the pilot signal comprises successfully demodulating the pilot signal when an actual time position of the pilot signal, due to drift, is up to substantially one and one-half chip positions from the expected time position.

11. The apparatus of claim 9, wherein the means for assigning at least one of the second or third demodulating means is in response to detecting an absence of multipath copies of the pilot signal.

12. A computer program product comprising a non-transitory computer readable medium encoded thereon with instructions that when executed cause a wireless communications apparatus operating in an idle mode to perform a method of demodulating a paging message during an assigned time slot, the method comprising:
   determining, in anticipation of the assigned time slot, an expected time position corresponding to a path of a pilot signal having a greater signal strength relative to other pilot signals;
   assigning a first demodulation element of a rake receiver to demodulate the pilot signal with reference to the expected time position;
   assigning a second demodulation element of the rake receiver to demodulate the pilot signal with reference to a time offset from the expected time position, wherein the time offset is a first time offset;
   assigning a third demodulation element of the rake receiver to demodulate the pilot signal with reference to a second time offset from the expected time position, wherein the second time offset is substantially equal to and opposite from the first time offset; and
   demodulating a signal to detect the paging message based at least in part on successfully demodulating the pilot signal using at least the first, second, or third demodulation element.

13. The computer program product of claim 12, wherein successfully demodulating the pilot signal comprises successfully demodulating the pilot signal when an actual time position of the pilot signal, due to drift, is up to substantially one and one-half chip positions from the expected time position.

14. The computer program product of claim 12, wherein assigning at least one of the second or third demodulation element is in response to detecting an absence of multipath copies of the pilot signal.

15. A method of demodulating a paging message during an assigned time slot by a wireless communications apparatus operating in an idle mode, the method comprising:
   deactivating one or more components of a rake receiver during un-assigned time slots;
   activating the one or more components of the rake receiver in anticipation of the assigned time slot;
   determining, in anticipation of the assigned time slot, an expected time position corresponding to a path of a pilot signal having a greater signal strength relative to other pilot signals, wherein determining the expected time position corresponding to the pilot signal is in response to the activating of the one or more components;
   assigning a first demodulation element of the rake receiver to demodulate the pilot signal with reference to the expected time position;
   assigning a second demodulation element of the rake receiver to demodulate the pilot signal with reference to a time offset from the expected time position; and
   demodulating a signal to detect the paging message based at least in part on successfully demodulating the pilot signal using at least the first demodulation element or the second demodulation element.

16. A method of demodulating a paging message during an assigned time slot by a wireless communications apparatus operating in an idle mode, the method comprising:
   determining, in anticipation of the assigned time slot, an expected time position corresponding to a path of a pilot signal having a greater signal strength relative to other pilot signals;
   assigning a first demodulation element of a rake receiver to demodulate the pilot signal with reference to the expected time position;
   assigning a second demodulation element of the rake receiver to demodulate the pilot signal with reference to a time offset from the expected time position,
   wherein assigning the second demodulation element is in response to detecting an operating condition corresponding to poor channel conditions, and wherein the second demodulation element is only assigned to demodulate the pilot signal in the idle mode in response to detecting the operating condition; and
   demodulating a signal to detect the paging message based at least in part on successfully demodulating the pilot signal using at least the first demodulation element or the second demodulation element.

17. The method of claim 16, wherein the second demodulation element is used to track pilot signals during a traffic mode.

18. A wireless communications apparatus for demodulating a paging message during an assigned time slot when operating in an idle mode, comprising:
   a rake receiver comprising a first demodulation element and a second demodulation element; and
   a controller configured to:
   deactivate one or more components of the rake receiver during un-assigned time slots;
   activate the one or more components of the rake receiver in anticipation of the assigned time slot;
   determine, in anticipation of the assigned time slot, an expected time position corresponding to a path of a pilot signal having a greater signal strength relative to other pilot signals, wherein the controller is configured to determine the expected time position corresponding to the pilot signal in response to the activating of the one or more components;
   assign the first demodulation element to demodulate the pilot signal with reference to the expected time position; and
   assign the second demodulation element of the rake receiver to demodulate the pilot signal with reference to a time offset from the expected time position, wherein the rake receiver is configured to demodulate a signal to detect the paging message based at least in part on successfully demodulating the pilot signal using at least the first demodulation element or the second demodulation element.

19. A wireless communications apparatus for demodulating a paging message during an assigned time slot when operating in an idle mode, comprising:
   a rake receiver comprising a first demodulation element and a second demodulation element; and
   a controller configured to:
   determine, in anticipation of the assigned time slot, an expected time position corresponding to a path of a pilot signal having a greater signal strength relative to other pilot signals;
   assign the first demodulation element to demodulate the pilot signal with reference to the expected time position;
   assign the second demodulation element of the rake receiver to demodulate the pilot signal with reference to a time offset from the expected time position, wherein the rake receiver is configured to demodulate a signal to detect the paging message based at least in part on successfully demodulating the pilot signal using at least the first demodulation element or the second demodulation element, and wherein the controller is configured to assign the second demodulation element in response to detecting an operating condition corresponding to poor channel conditions, wherein the second demodulation element is only assigned to demodulate the pilot signal in the idle mode in response to detecting the operating condition.

20. The apparatus of claim 19, wherein the second demodulation element is used to track pilot signals during a traffic mode.

* * * * *